June 19, 1934.    J. A. FLYNN    1,963,123
LOW LEVEL INDICATOR FOR ELECTROLYTE OF STORAGE BATTERIES
Filed April 26, 1933
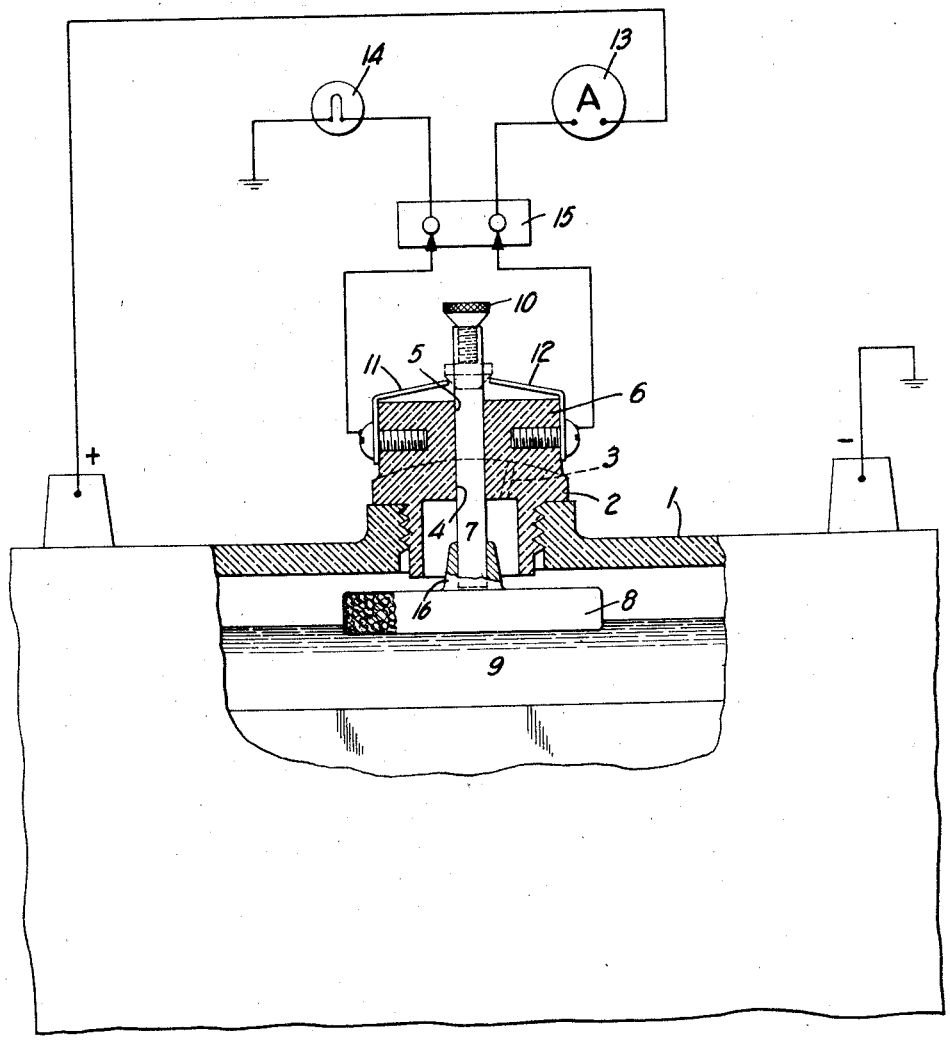
INVENTOR
John A. Flynn.
BY Moses & Nolte
ATTORNEYS Patented June 19, 1934

1,963,123

UNITED STATES PATENT OFFICE 1,963,123

LOW LEVEL INDICATOR FOR ELECTROLYTE OF STORAGE BATTERIES

John A. Flynn, New York, N. Y.

Application April 26, 1933, Serial No. 668,023

2 Claims. (Cl. 200—84)

This invention relates to signalling means for indicating the low level of electrolyte or other liquid in storage batteries.

A principal object of the invention is to provide a float adapted to be buoyed up by the liquid content of the battery chamber, which float is made of resilient material adapted to be so constricted as to be passed through the mouth of the cell chamber and resume its unconstricted condition after being passed therethrough.

Another principal object of the invention is to make such float of a homogeneous material in which the inner part is cellular while the outer part constitutes a skin cover. I find sponge rubber to be a satisfactory material for such float.

Another object of my invention is to so mount the float as to make and break a circuit with a signalling device upon the lowering and raising of the liquid level of the cell with which it is used.

Another object of the invention is to provide means for readily removing the battery together with its float from its circuit with the signalling device and as readily replacing the same in said circuit.

Other objects will be apparent from reading this specification taken in connection with the accompanying drawing.

The drawing, which consists of one figure, is a fragmentary vertical view of the cell of a storage battery embodying my invention, which view also shows in diagrammatic form the electric circuit in which the signalling device is located.

Referring now in detail to the drawing, 1 represents a cell of a storage battery. 2 is the cap therefor having the usual vent 3. The construction so far described is that of a conventional battery. The cap 2 contains a central bore 4 which registers with a central bore 5 in the insulator 6, the said insulator being superposed on the cap 2, as shown, and being preferably integral therewith. Extending through said bores 4 and 5 and in close slidable contact with the walls thereof is a guide rod of insulating material 7, at the bottom of which and adapted to control the movement thereof is secured the float 8 supported and controlled in its position by the liquid 9. At the upper end of the rod 7 is threaded a metal screw contact 10 adapted to contact with the metal contacts 11 and 12 when the liquid in the cell has reached a low enough level to make the adding of additional liquid to the cell advisable. These contacts 11 and 12 are mounted on the insulator 6 and are in circuit with the ammeter 13 and the signalling device 14, the latter being here shown in the form of an electric lamp.

The contacts 11 and 12 are connected by wires to terminal posts mounted on an insulated contact block 15 having a conveniently permanent location adjacent the battery. To prevent corrosion at the battery, the wires are preferably soldered to the screws by means of which contacts 11 and 12 are mounted on insulator 6. The remote ends of these wires are provided with readily detachable connectors such as spring clips, indicated diagrammatically by arrowheads, for effecting connection to the terminals on block 15. By virtue of this arrangement these contacts may readily be broken upon the removal of the storage battery and readily restored upon the replacement thereof.

The float 8 may be made of any suitable material which is adapted to be constricted sufficiently to enable it to be passed through the filler hole of the cell, and upon being released assume its original form. My present preference for this purpose is sponge rubber having a skin coating on the exterior which may be fabricated from the material of which the interior is composed. A hub cup 16 is centrally situated on the float 8 and is preferably composed of the same material as, but of greater density than, that of the float, and is preferably molded therewith. The lower end of the rod 7 is inserted in said cup as shown and preferably is held therein by friction.

When the electrolyte or other liquid is at a normal level in the cell it will support the float in such position as to extend the screw contact 10 out of contact with the contacts 11 and 12. Upon the level of the electrolyte or other liquid receding, the float will drop with it, bringing down the rod 7 and the screw contact 10 until it reaches the level when electrolyte or other liquid should be added to the cell. When it gets to this point the screw contact 10 is in circuit with the contacts 11 and 12 and such contacts being in circuit with the lamp 14 such lamp will ignite, giving the signal that the battery needs to be serviced. The screw contact 10 is adapted to be screwed into the rod 7 as shown and adjustment may be made by screwing down or up the said contact for the purpose of accelerating or retarding the signal. In other words, when it is desired to effect such signal at a higher or lower level of the liquid in the cell, the screw contact 10 is respectively screwed in a downward direction or an upward direction.

In the above description I have shown my device in use with a single cell. It will be understood that a battery of cells may be wired so that upon the liquid in any cell falling below the minimum height desired the signal will be given.

I have described what I believe to be the best embodiments of my invention. I do not wish, however, to be confined to the embodiments shown, but what I desire to cover by Letters Patent is set forth in the appended claims.

I claim:

1. In a float operated switch for a battery cell having a filler opening and a cap therefor, a float larger than said filler opening and composed of soft, resilient cellular rubber adapting it to be constricted and bent and in such form passed through the cell opening and then resume its unconstricted form, said float being provided with a guide mounted on and extending vertically from said float and adapted to be passed through a guide-way provided in the cap for the filler opening of the cell, and means for controlling a circuit operated by said guide.

2. In a float operated switch for a battery cell having a filler opening and a cap therefor, a float consisting of a flat block of material for riding flatwise on the liquid content of the cell, said float having a length greater than the diameter of the filler opening of the cell, and being composed of soft, resilient cellular rubber adapting it to be constricted and bent and in such form passed through the cell opening and then resume its unconstricted form, said float being provided with a guide mounted on and extending vertically from the flat side of said float and adapted to be passed through a guide-way provided in the cap for the filler opening of the cell, and means for controlling a circuit operated by said guide.

JOHN A. FLYNN.